United States Patent
Konishi et al.

(10) Patent No.: US 8,523,676 B2
(45) Date of Patent: Sep. 3, 2013

(54) GAME TERMINAL DEVICE AND GAME TERMINAL DEVICE GAME ENVIRONMENT SETTING METHOD

(75) Inventors: Kazuma Konishi, Kobe (JP); Masakazu Shibamiya, Kobe (JP); Yasuyuki Nagatomo, Kobe (JP); Kenichi Yamamoto, Kobe (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 981 days.

(21) Appl. No.: 12/223,904

(22) PCT Filed: Jan. 19, 2007

(86) PCT No.: PCT/JP2007/050778
§ 371 (c)(1),
(2), (4) Date: Jul. 13, 2009

(87) PCT Pub. No.: WO2007/094148
PCT Pub. Date: Aug. 23, 2007

(65) Prior Publication Data
US 2010/0227679 A1    Sep. 9, 2010

(30) Foreign Application Priority Data

Feb. 14, 2006 (JP) .................................. 2006-036769

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .......................................................... 463/42

(58) Field of Classification Search
USPC ............................................... 463/16, 6, 421
See application file for complete search history.

(56) References Cited

U.S. PATENT DOCUMENTS

| | | | |
|---|---|---|---|
| 4,572,509 A * | 2/1986 | Sitrick | 463/31 |
| 6,042,476 A | 3/2000 | Ohashi et al. | |
| 7,618,325 B2 * | 11/2009 | Yamada et al. | 463/42 |

(Continued)

FOREIGN PATENT DOCUMENTS

| | | |
|---|---|---|
| JP | 7-204346 | 8/1995 |
| JP | 8-323043 | 12/1996 |
| JP | 10-171741 | 6/1998 |
| JP | 2000-245958 | 9/2000 |
| JP | 2003-143383 | 5/2003 |
| JP | 2003-318902 | 11/2003 |
| JP | 2004-362458 | 12/2004 |
| TW | 243068 | 11/2005 |

*Primary Examiner* — Omkar Deodhar
*Assistant Examiner* — Reginald Renwick
(74) *Attorney, Agent, or Firm* — Jordan and Hamburg LLP

(57) ABSTRACT

A game terminal device is provided with a game environment display controlling section for issuing a transmission request to at least one of other game terminal devices via a communication cable, receiving set contents of game environments stored in storage means of the other game terminal devices having received the transmission request and displaying the received set contents on a monitor when a change to an environment setting mode is instructed by an environment mode setting section; and a game environment setting section for updating the set contents of the game environment written in the storage means of the own game terminal device to the set contents of the game environment stored in the storage means of a specified one of the other game terminal devices displayed on the monitor. It is possible to cope with the game environments of the individual game terminal devices, easily perform a modification process as compared with the conventional system of the type in which a setting operation is performed in each individual game device and enable an autonomous modification instruction of the game terminal device side.

18 Claims, 11 Drawing Sheets

(56) References Cited

U.S. PATENT DOCUMENTS

| | | | |
|---|---|---|---|
| 7,651,002 B2 * | 1/2010 | Hennemann et al. | 215/235 |
| 7,785,203 B2 * | 8/2010 | Uchida et al. | 463/40 |
| 7,972,214 B2 * | 7/2011 | Kinsley et al. | 463/42 |
| 2003/0198229 A1 | 10/2003 | Ochi et al. | |
| 2004/0180718 A1 * | 9/2004 | Uchida et al. | 463/31 |
| 2004/0204235 A1 * | 10/2004 | Walker et al. | 463/29 |
| 2006/0035713 A1 * | 2/2006 | Cockerille et al. | 463/42 |
| 2007/0265095 A1 * | 11/2007 | Jonishi | 463/42 |

* cited by examiner

GAME TERMINAL DEVICE AND GAME TERMINAL DEVICE GAME ENVIRONMENT SETTING METHOD

FIELD OF TECHNOLOGY

The present invention relates to technology for setting a game environment of a game terminal device capable of executing video games.

BACKGROUND TECHNOLOGY

Conventionally, there has been known a game system enabling multiplayer games by installing a plurality of game devices offering driving games and the like in a shop and connecting the game devices with each other via communication cables to exchange operation information of players among a plurality of game devices. When this multiplayer game is selected, the same game space is developed on displays of the respective game devices participating in the game and a game, in which an own racing car driven by a player and those driven by other players complete, is executed. On the other hand, a single-player game is also possible. When this single-player game is selected, a game, in which a simulated own racing car driven by a player and a CPU racing car whose driving is controlled by a computer complete, is executed. Particularly, in a game system capable of executing a single-player game and a multiplayer game, a plurality of game conditions or game environments favorable to the respective game devices are prepared. These include, for example, a game time and the number of laps of the race course as conditions to end the game and various game conditions such as difficulty levels. The respective game devices are constructed such that the contents of the game conditions and game environments can be individually set by an operator of a game arcade.

Conventionally, game conditions and game environments have been set in individual game devices, but the setting has had to be performed by the number of the game devices. Thus, there has been a problem of taking considerable time and labor for a setting operation, an operation of changing the contents and other operations.

Patent literature 1 proposes a game system in which one of a plurality of game devices is a master device, the remaining ones are slave devices, and contents of game environment items set in the master device are transmitted from the master device to all the slave devices to rewrite the contents of the game environment items of the respective slave devices into those of the master device at once, thereby saving time and labor in operating machines in a shop and preventing man-made setting mistakes caused by individual setting.
Patent Literature 1:
Japanese Unexamined Patent Publication No. H08-323043

However, by the method of patent literature 1, all the game devices in the shop need to be set as a master device or as a slave device, which increases a burden of software. Further, since the game environment is set in the slave devices in the shop at once, game environment setting requests to the individual game devices cannot be met. If the slave devices are focused, it is difficult to confirm whether or not updating has been correctly performed since the game environment is set without involving any direct operations.

DISCLOSURE OF THE INVENTION

In view of the above problems, an object of the present invention is to provide a game terminal device and a game terminal device game environment setting method which are capable of coping with game environments of individual game terminal devices, easily performing a modification process as compared with the conventional system of the type in which a setting operation is performed in each individual game device and issuing an autonomous modification instruction from the game terminal device side.

One aspect of the present invention is directed to a game terminal device, comprising communication means for transmitting and receiving information to or from one or more other game terminal devices; storage means for storing information; operation means for instructing an operating state to be changed to an environment setting mode; display means for displaying set contents of a game environment; game environment display control means for, in the environment setting mode, issuing a transmission request to at least one of the other game terminal devices via the communication means, receiving set contents of game environments stored in storage means of the other game terminal devices having received the transmission request and displaying the received set contents on the display means; updating means for updating the set contents of the game environment written in the storage means to the set contents of the game environment stored in the storage means of a specified one of the other game terminal devices displayed on the display means; and transmission means for transmitting the set contents of the game environment stored in the storage means to the game terminal device requesting the transmission upon receiving the transmission request.

The above game terminal device can cope with game environments of individual game terminal devices, a modification process can be more easily performed as compared with the conventional system of the type in which a setting operation is performed in each individual game terminal device, and an autonomous modification instruction can be issued from the game terminal device side.

BEST MODES FOR EMBODYING THE INVENTION

Figure 1:
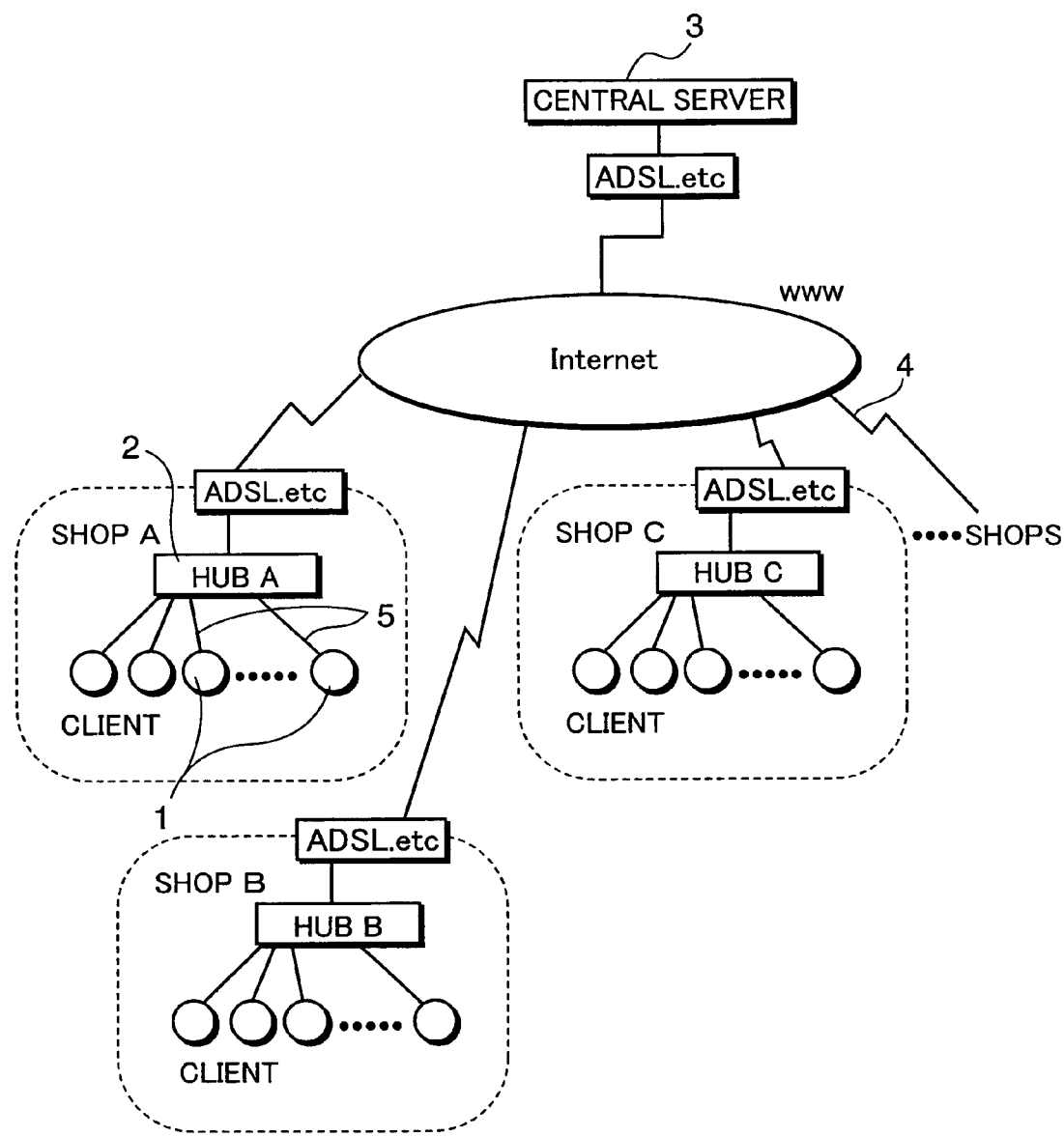
FIG. 1 is a construction diagram of a game system to which game terminal devices according to the invention are applied.

FIG. 1 is a construction diagram of a game system to which game terminal devices according to the present invention are applied. The game system is provided with game terminal devices 1 respectively assigned with corresponding identification information, hubs (HUBs) 2 each communicably connected with a plurality of (eight in this example) game terminal devices 1 via communication cables 5, and a central server 3 for performing player management and game result management via communication lines 4 and a network such as a WWW network in this embodiment. Each game terminal device 1 receives specified operations a player carries out while referring to game screens displayed on a monitor, and proceeds with a game in accordance with operation signals and the like from the other game terminal devices 1.

The identification information assigned in correspondence with each game terminal device 1 includes identification information of a shop where this game terminal device 1 is installed, and identification information (referred to as a "terminal number") of this game terminal device 1 in the shop where this game terminal device 1 is installed. For example, if the identification information of the game terminal device 1 in a shop A is "4", the identification information of this game terminal device 1 may be A-4. Each hub 2 is communicably connected with a plurality of (eight in this example) game terminal devices 1 and the central server 3, and transmits and receives data mainly for management to and from the game terminal devices 1 and the central server 3. The central server 3 administers the progress of a competition game by the game terminal devices 1 to be operated by players being so connected with each other as to be able to communicate operation signals necessary for the progress of the game via the communication cables 5.

Figure 2:
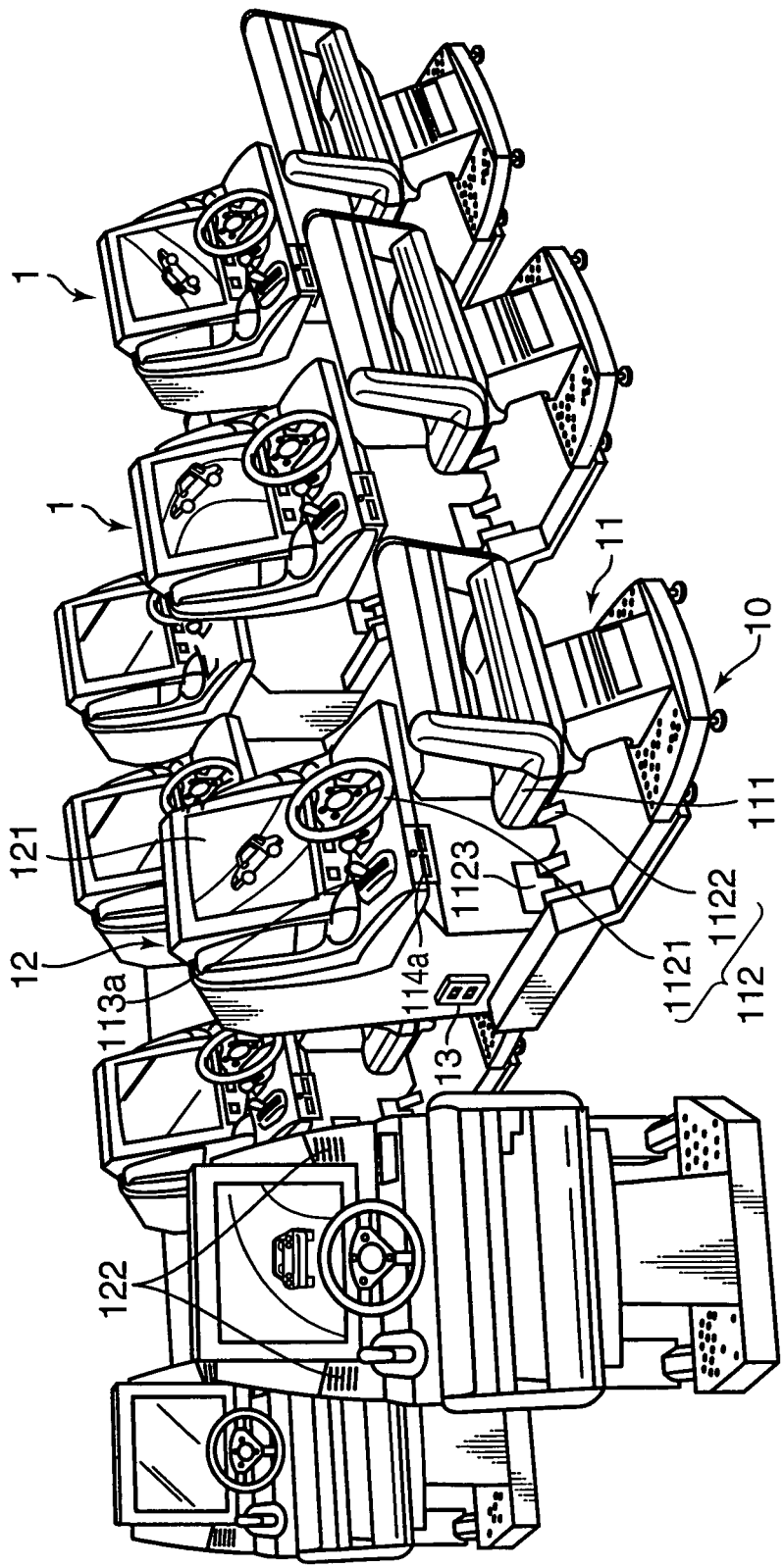
FIG. 2 is a perspective view showing the external appearance of one embodiment of the game terminal devices installed in a shop.

FIG. 2 is a perspective view showing the external appearance of one embodiment of the game terminal devices installed in the shop. In FIG. 2, eight identically shaped game terminal devices are arranged. The game terminal devices 1 of this embodiment are used for a driving game. Each game terminal device 1 includes a controller main unit 11 simulating a driver's seat of a race car (automobile) and a monitor unit 12 arranged in front of and above the controller main unit 11. The controller main unit 11 and the monitor unit 12 are connected or united by a base unit 10 at the bottom in this embodiment. The controller main unit 11 includes a seat portion 111 set at a specified height on a rear side, and operable members 112 simulating a handle 1121 on a front side and an accelerator pedal 1122 and a brake pedal 1123 on a floor side. Out of the operable members 112, the handle 1121 is rotatably mounted on the tip of a rotary shaft embedded in the controller main unit 11, and a rotation amount detector 112*a* (see FIG. 3) such as a rotary encoder is provided on this rotary shaft to enable the detection of an angle of rotation of the rotary shaft (i.e. handle 1121) with respect to a frontal direction. Further, the accelerator pedal 1122 of the operable members 112 is rotatable about a horizontal supporting shaft on the right side of the floor surface so as to be operable by the player's foot. An acceleration amount detector 112*b* (see FIG. 3) is constructed, for example, such that a variable resistor is integrally mounted on the above supporting shaft and an operated amount, i.e. an acceleration amount is detected by outputting a voltage of a level corresponding to an angle of rotation of the supporting shaft. Further, the brake pedal of the operable members 112 has a construction similar to the accelerator pedal 1122. In other words, the brake pedal 1123 is rotatable about the horizontal supporting shaft on the left side of the floor surface so as to be operable by the player's foot. A brake amount detector 112*c* (see FIG. 3) is constructed, for example, such that a variable resistor is integrally mounted on the above supporting shaft and an operated amount, i.e. a brake amount is detected by outputting a voltage of a level corresponding to an angle of rotation of the supporting shaft.

Each game terminal device 1 also includes a coin insertion slot 113*a* of a coil receiver 113 (see FIG. 3) for receiving coins or medals necessary to play a game and a card insertion slot 114*a* for guiding an individual card to a card reader 114 for reading data from the individual card storing data authenticating the player and the like. The coin receiver 113 also includes an unillustrated coin discharge opening for discharging the coin if the inserted coil is a false coin. The card reader 114 reads individual information from the individual card when the individual card such as a magnetic card or IC card storing the identification information including a user ID is inserted into the card insertion slot 114*a*.

The monitor unit 12 includes a monitor 121 arranged to face backward for displaying game screens and loudspeakers 122 mounted on a panel portion below the monitor 121 for outputting BGM and sound effects.

An outlet 13 is provided at a suitable position of the base unit 10, preferably at a position difficult to see from the player sitting on the seat portion 111 of the controller main unit 11. A plug of the communication cable 5 connected with the hub 2 and a plug of a power supply line 6 for supplying power to operate the game terminal device are insertable into the outlet 13. External power supplied from the power supply line 6 is introduced to a power supply circuit 14 (see FIG. 3) provided in the game terminal device 1, and currents of levels necessary for the respective parts are generated in the power supply circuit 14. The both plugs of the power supply line and the communication cable may be inserted into separately prepared outlets. Further, a power supply switch may be used instead of the power supply plug.

Although not shown in FIG. 2, a maintenance box, which is normally locked and opened and closed by a special key carried by an operator, is provided at a suitable position of each game terminal device 1 such as at the base unit 10, and a construction (environment setting operation unit 15 in FIG. 3) for setting a game environment to be described later and an environment setting button (first operable means) for switching a mode between a game processing mode and an environment setting mode are provided in this maintenance box. Instead of the environment setting button, a dip switch may be provided.

A control unit 16 (see FIG. 3) including a microcomputer and the like for receiving detection signals from the respective parts and outputting control signals to the respective parts is arranged at a suitable position of each game terminal device 1.

Figure 3:
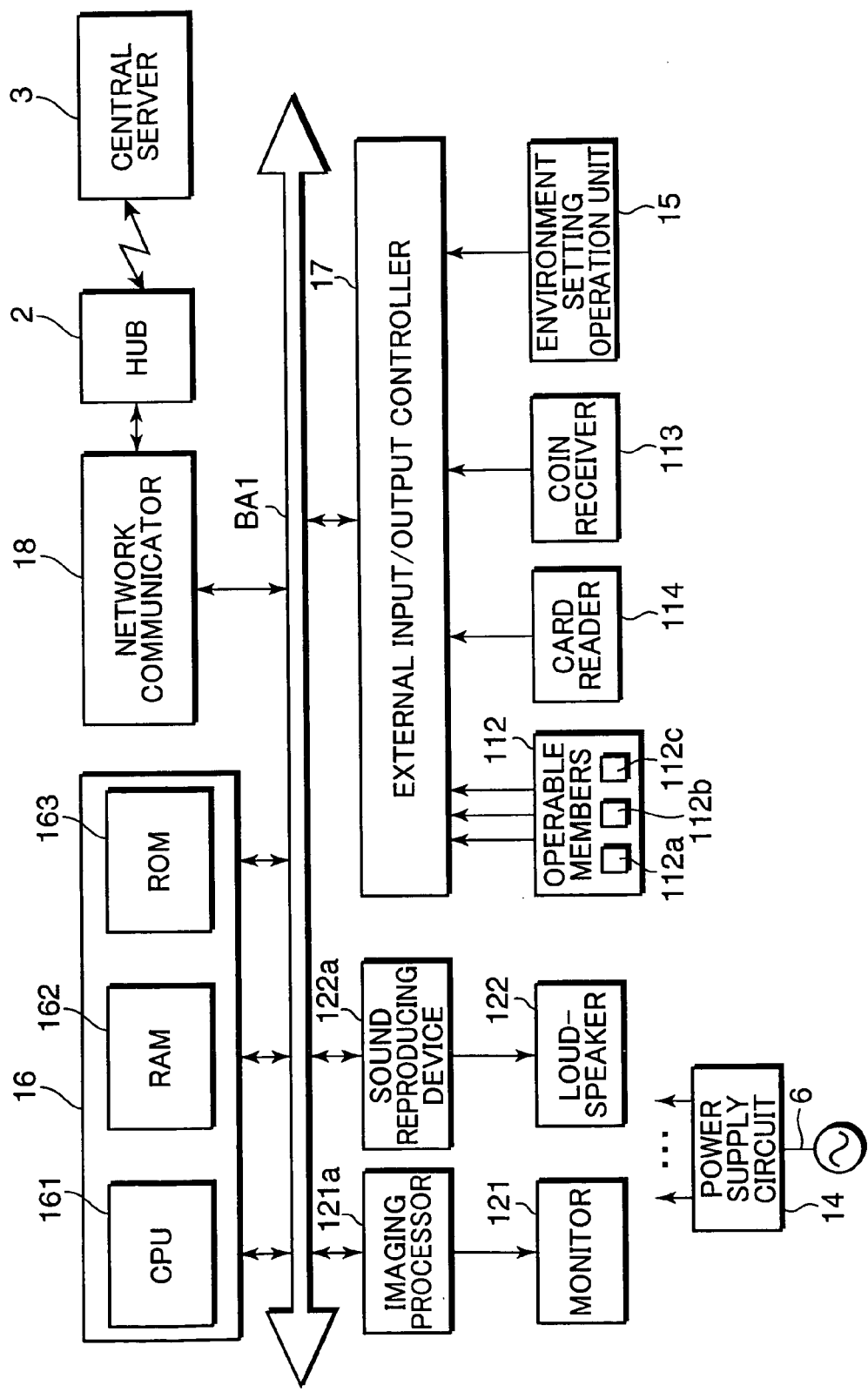
FIG. 3 is a hardware construction diagram showing the embodiment of the game terminal devices.

FIG. 3 is a hardware construction diagram showing one embodiment of the game terminal device 1. The control unit 16 is for controlling the overall operation of the game terminal device 1, and includes an information processor (CPU) 161, a RAM 162 for temporarily saving information and the like obtained during processes, and a ROM 163 storing image information including various game images, a game program and the like. An external input/output controller 17 is an I/O for transmitting and receiving command signals, detection signals and operation signals between the control unit 16 and the card reader 114, the coin receiver 113, the operable members 112 and the environment setting operation unit 15. The card reader 114 may have a writing function of suitably writing contents of modification.

An imaging processor 121*a* is for causing the monitor 121 to display a desired image in accordance with an image displaying instruction from the control unit 16 and includes a video RAM and the like. A sound reproducing device 122*a* is for outputting a specified message, BGM, sound effect or the like to the loudspeakers 122 in accordance with an instruction from the control unit 16.

Various image data including a circuit (race course), landscape images around the circuit, own and competitor car images are stored in the ROM 163. Each image is constituted by a necessary number of polygons so as to enable the three-dimensional imaging. The imaging processor 121a performs a calculation for the conversion from positions in a three-dimensional space to those in a simulated three-dimensional space, a light source calculation and other calculations in accordance with an imaging instruction from the CPU 161, and writes an image data to be imaged in the video RAM, for example, writes (adheres) texture data in (to) an area of the video RAM designated by polygons based on the calculation results. Here, a relationship between the operation of the CPU 161 and that of the imaging processor 121a is described. The CPU 161 reads the above image data, sound data, game program and processing program data from the ROM 163 in accordance with an operating system (OS) stored in the ROM 163 which is built in or detachably mountable from the outside. Some or all of the read image data, sound data, program data, etc. are saved in the RAM 162. Thereafter, the CPU 161 performs processes in accordance with the control program and various data (image data including polygons and textures of objects to be displayed and other character images, and sound data) saved in the RAM 162 and detection signals and the like from detectors.

Out of various data stored in the ROM 163, those that can be stored in a detachable storage medium may be made readable by a driver such as a hard disk drive, an optical disk drive, a flexible disk drive, a silicon disk drive, or a cassette medium reader. In such a case, the recording medium is, for example, a hard disk, an optical disk, a flexible disk, a CD, a DVD or a semiconductor memory.

A network communicator 18 is for transmitting and receiving information such as information from the card reader 114, game result at the end of the game and ranking display to and from the central server 3 via the communication line 4 (and hub 2) and the communication cable 5.

A game environment setting program for changing various items for specifying the later-described game environment from contents of defaults set at the time of manufacturing/shipment later if necessary or rewriting them through transmission is stored in the ROM 163. The game environment items differ depending on the type of the game. In a driving game, "volume of sound effect", "volume of sound effect of an own car", "volume of sound effects of competitors' cars", "continuable game stage number (loop setting)", "lap number", "life (limit number of crashes at which the game is forcibly ended)", "time required to pass a specified position set in the middle of the course of the driving game (initial time)", "continue (number of continuously playable games), "magnitude of rotation load of a handle (representing large-size to small-size cars), "display type of speed meter (in km or in miles)", "coin value setting (number of coins equivalent to 1 credit, the number of coins necessary to play one game)", "game time" and the like can be thought as such items.

Figure 4:
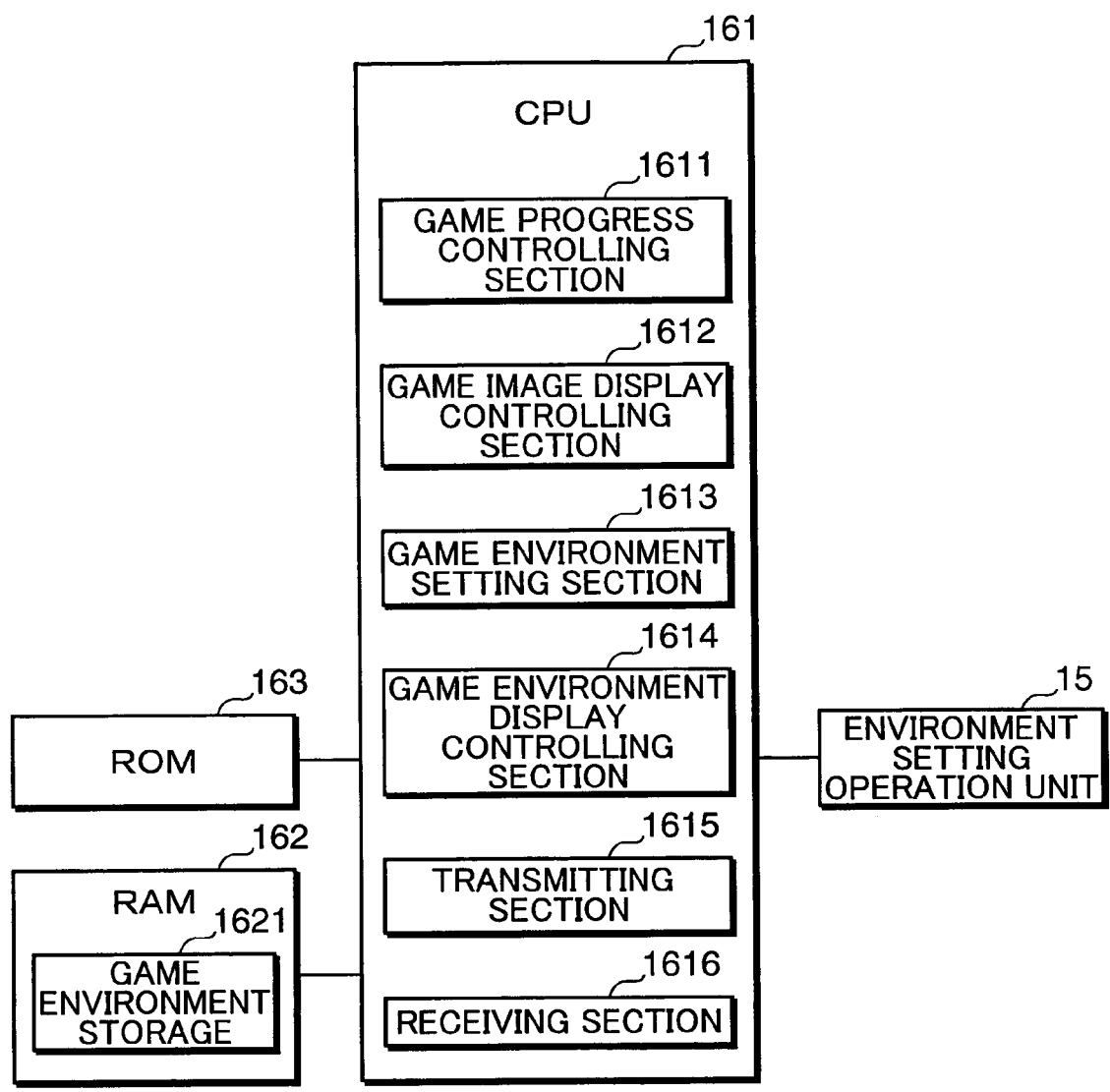
FIG. 4 is a functional construction diagram of a CPU of the game terminal device.

FIG. 4 is a functional construction diagram of the CPU 161 of the game terminal device 1. A game progress controlling section 1611 reads the individual card of the player, confirms the insertion of coins, performs a series of controls from the start to the end of the game, displays the game result and transmits and receives various data to and from the central server 3. A game image display controlling section 1612 instructs the imaging processor 121a to display various images in accordance with the progress of the game. A transmitting section 1615 and a receiving section 1616 transmit and receive data to and from the other game terminal devices 1 in a multiplayer game and transmit and receive data to and from the central server 3. Here, the summary of the driving game is described.

When an individual card is inserted into the card reader 114 by a player (in the case of a single-player game), individual data are read from the individual card. The read individual data are transmitted to the central server 3 by the transmitting section 1615 for an authentication process. When coins are successively inserted by the player, a race course is displayed on the monitor 121 by the game image display controlling section 1612, a player's own car character (hereinafter, referred to as an own car) is displayed at a starting point of the race course, and one or more specified number of computer-controlled car characters (hereinafter, referred to as CPU cars) are further displayed depending on the type of the game. Then, countdown sounds are given from the loudspeakers 122 and a countdown representing image is displayed to start the game. The player sitting on the seat portion 111 operates the operable members 112 such as the handle, the accelerator pedal and the brake pedal while seeing game screens displayed on the monitor 121 in front, and the game progress controlling section 1611 executes the game in accordance with detection signals from the rotation amount detector 112a, the acceleration amount detector 112b and the brake amount detector 112c through these operations. In this way, the player operates the own car displayed on the monitor 121 to compete with the other CPU cars appearing in a game space. A time from the start of the game to a goal position after finishing a set number of laps is measured by a built-in timer, and a lap time is displayed as a game result on the monitor 121. In this case, ranking may also be displayed. Upon the completion of the game, the game result is stored in the central server 3 in correspondence with the player via the communication cable 5 and the communication line 4. Game results of players having played the single-player game in the respective game terminal devices in the respective shops are stored in the central server 3 and ranked according to the lap times. The game progress controlling section 1611 displays, for example, a specified number of best players together with the rankings as the game result on the monitor 121.

In this game system, a multiplayer game (competition game) played by two or more players is possible (in the case of a multiplayer game). This case is described with respect to a driving game. Game histories are accumulated for the display of rankings for each type of the race (selectable according to the player number, course type, vehicle type and the like). Here, a game played by four players is described for the sake of convenience. In this case, one or more necessary number of CPU cars may be included. In this game, the rankings and lap times of the four players are competed.

When an individual card is inserted by the players, individual data read by the card readers 114 are transmitted to the central server 3 for an authentication process. When coins are subsequently inserted by the player, participation in the game is permitted. Here, it is kept in a standby state unless four players have participated. A corresponding standby screen is displayed on the monitor 121 or, alternatively, a specified mini-game (e.g. individual race game to compete a dash time of a so-called 0-400 race) may be executed to solve boredom. Upon the elapse of a specified waiting time, the game may be started by replacing lacking player(s) by CPU car(s) controlled by the CPU. The central server 3 performs a process of fitting the participants in the game to combinations of the respective competitions. If four players participate in the same shop, the game is started. As described in the single-player game, the respective players operate their own car characters. As shown in FIG. 2, the game image display controlling section 1612 sets a viewpoint of a virtual camera at a suitable position of the own car on the monitor 121 in front of each player and images a game space with the viewpoint set substantially in the center of the screen. Besides the own car character, the car characters of the competitors are also displayed on each monitor 121.

This process is executed as follows by the control unit 16. The course data and the surrounding landscape data themselves stored in the ROM 163 are respectively defined as individual polygon data as three-dimensional position data. Accordingly, a corresponding landscape image can also be adhered to the same game space by developing a suitable reference position in the race course in relation to a world coordinate system. On the other hand, the positions of the respective car characters in the same game space are determined in relation to the world coordinate system, and a course is specified by being converted into coordinates through the contents of operations performed to the respective operable members 112. As a result, the respective car characters can be imaged as game images as parts of the world coordinate system displayed on the monitor 121. The contents of operations performed to the respective operable members 112 are read, for example, in a specified cycle (1/60 sec.) and a moved amount and a moving direction from the coordinates immediately before are calculated from these contents, and the calculated amounts are added to the coordinate values immediately before to update the coordinates to present coordinates. The imaging process of the car characters are repeatedly performed based on the updated coordinate data and moving direction data, whereby the game images are imaged as moving images. The present coordinate data obtained in each game terminal device 1 is also transmitted to the game terminal devices of the competitors together with the identification information of the game terminal device 1 via the communication cables 5 every time. In each game terminal device, the images of all the car characters are stored in correspondence with the corresponding game terminal devices. Utilizing these data, the game images are imaged based on the own viewpoint and new coordinate data from the other game terminal devices are reflected on the game images to image the car characters of the competitors. When the respective car characters reach the goal after driving around the race course by a specified number of laps, lap times are measured and the rankings and lap times of the respective players are displayed in correspondence with the players on a game result screen. This game result is transmitted to the central server 3 and stored as the game record in correspondence with the players. Upon receiving a new game record, the central server 3 obtains an overall result in the shop from a process of rearranging the rankings in accordance with the lap times and ranking information (cumulative values of the lap times if necessary), returns it to the game terminal devices 1 having executed the game and causes the monitor 121 to display it.

Various game environments are set beforehand in the game terminal devices capable of executing the single-player game and the multiplayer game. Contents of game environment items are set by an operator who administers a game arcade or the like using the environment setting operation unit 15.

In FIG. 3, the monitor 121 displays various environment setting contents, game environment contents for confirming the set contents and game environment contents received from the other game terminal device in addition to game images. The environment setting operation unit 15 includes a joy stick for setting environment items and a touch panel placed on the screen of the monitor 121 and used to press down buttons displayed on the monitor 121 for instructing operations in addition to the environment setting button. The touch panel is a known one in the form of a transparent panel with an array of linear pressure-sensitive elements, detects a position pressed by the operator and detects which button has been pressed down from a correspondence between the detected position information and an address position of the button on the screen.

Referring back to FIG. 4, the CPU 161 is further provided with the following function processing sections. Specifically, a game environment setting section 1613 operates in an environment setting mode and sets a mode environment according to the operation by the operator, i.e. performs a processing of storing the set contents in a game environment storage 1621. A known backup processing is applied to the contents of the game environment storage 1621 so that data are not deleted even while the device is turned off or may be updated and written in a rewritable ROM. Normally, contents of defaults are set at the time of shipment from a factory and can be modified if necessary later.

Further, the game environment setting section 1613 receives the contents of the game environments set in the other game terminal devices via the transmitting section 1616, the game environment display controlling section 1614 causes the monitor 121 to display the received contents, and then the contents of the game environment being displayed are updated in the game environment storage 1621.

Figure 5:
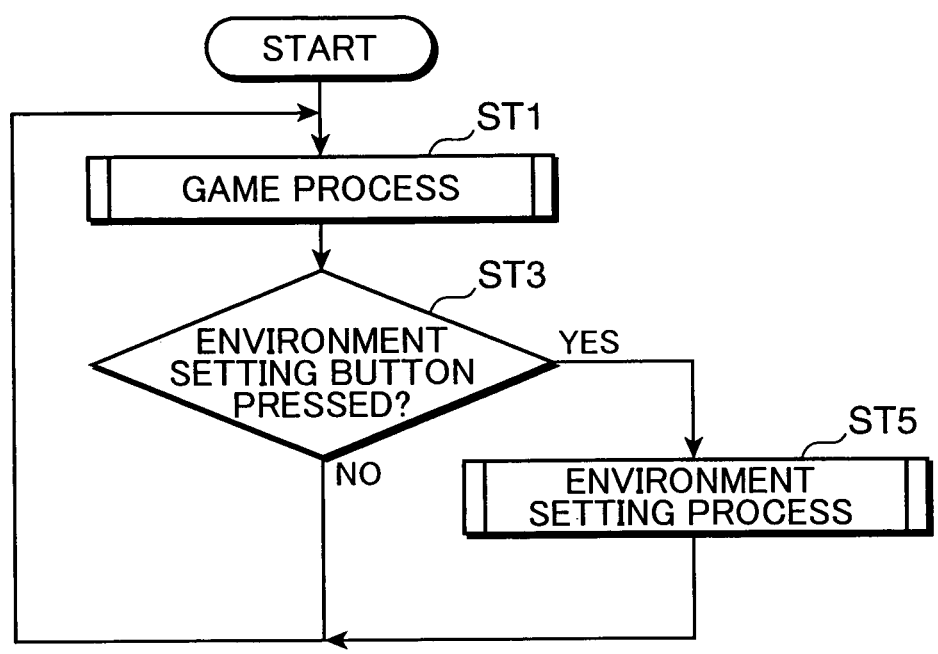
FIG. 5 is a flow chart of basic setting.
Figure 8:
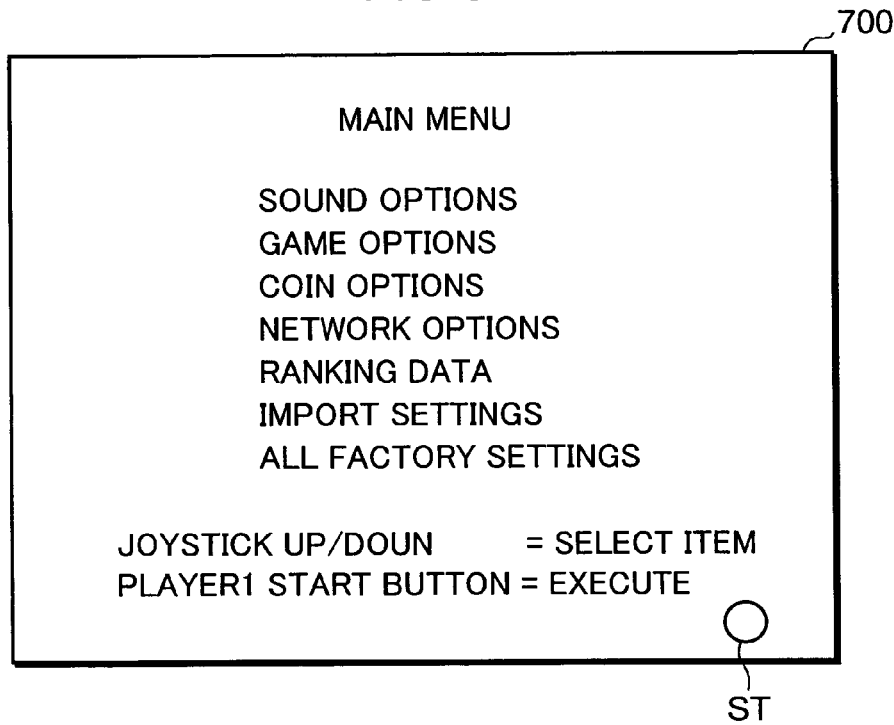
FIG. 8 is a diagram showing an example of a menu screen when an environment setting button is pressed down.

FIG. 5 is a flow chart of basic setting. In FIG. 5, a game processing mode is normally set to judge whether or not the environment setting button has been pressed (Step ST3). When the operator turns the environment setting button on, a new screen 700 as shown in FIG. 8 is displayed on the monitor 121 of the game device 1 by the game environment display controlling section 1614 and the game terminal device 1 transfers to the environment setting mode for performing an environment setting process (Step ST5). When the environment setting button is turned off, the mode is returned to the game processing mode.

Figure 9:
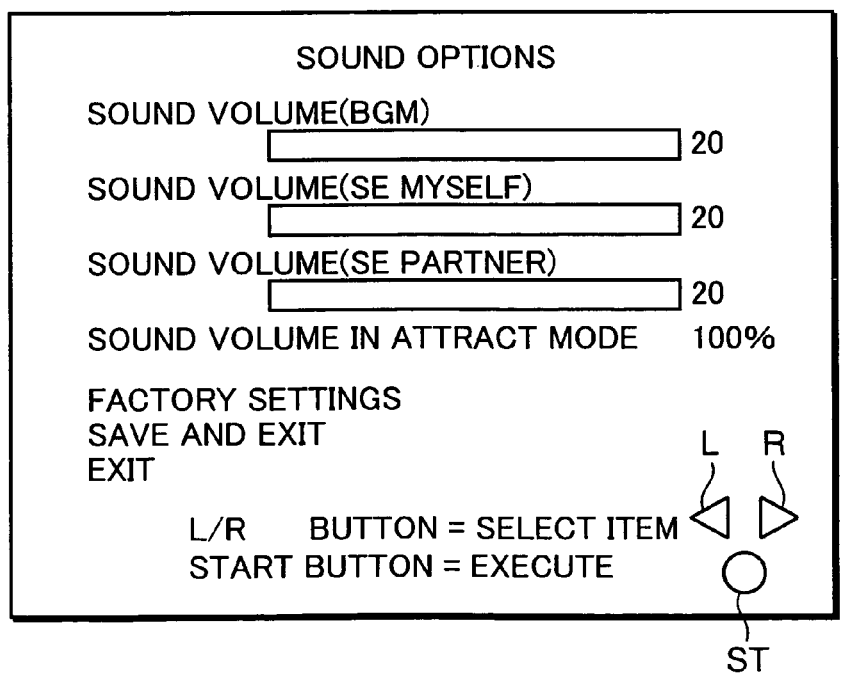
FIG. 9 is a diagram showing an example of a sound option setting screen.
Figure 10:
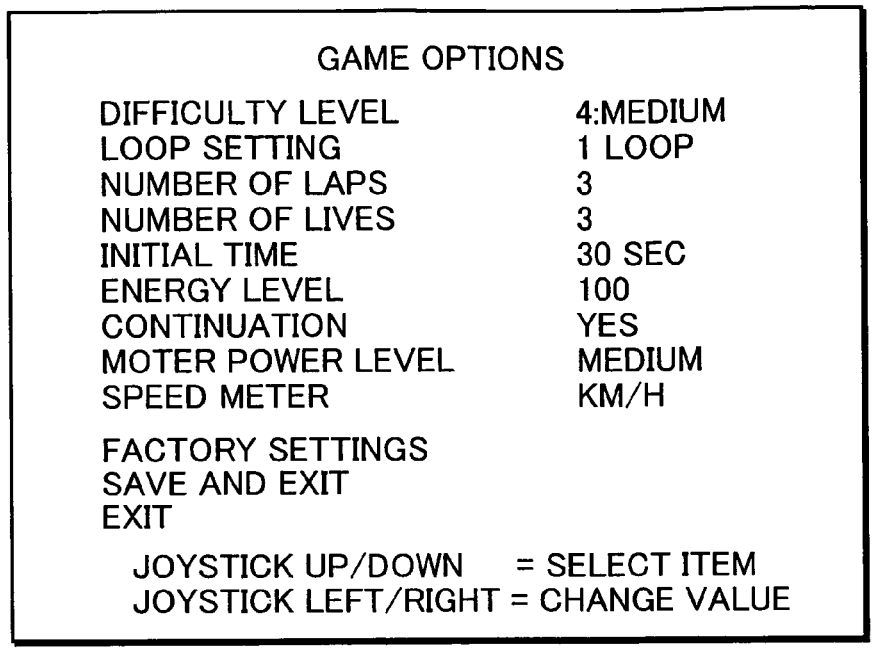
FIG. 10 is a diagram showing an example of a game option setting screen.
Figure 11:
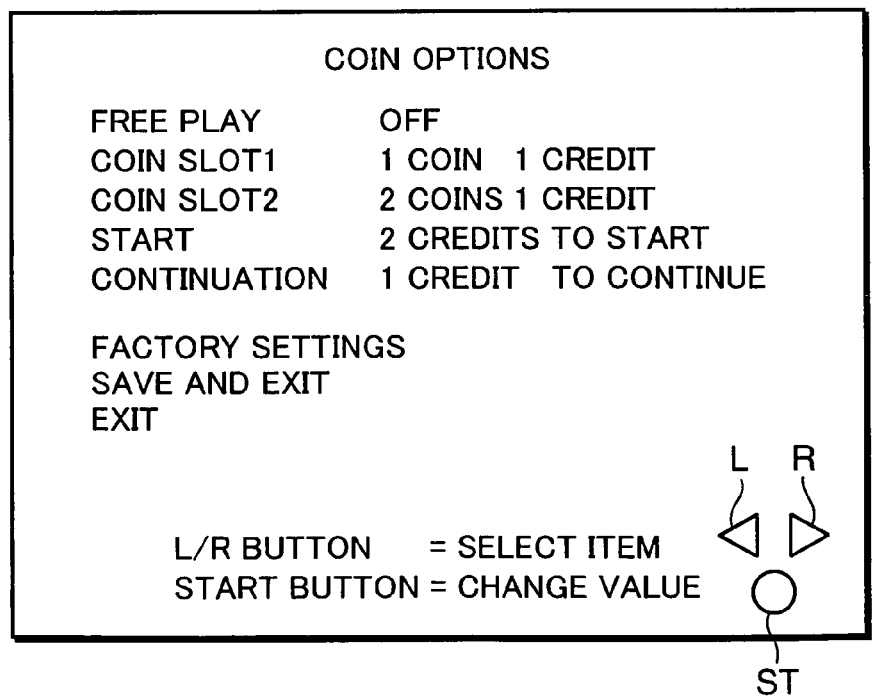
FIG. 11 is a diagram showing an example of a coin option setting screen.

The menu screen 700 is formed such that input screens for the input of various game environments can be selected, and the operator can select a desired item by operating the environment setting operation unit 15. For example, a sound option, a game option, a coin option, a network option, a ranking option and the like are displayed on the menu screen 700. The joystick of the environment setting operation unit is used to select the item and, when a specified button on the screen is pressed down, the selected item is selected to move onto the next screen. In the case of selecting the sound option, transition is made to a screen of FIG. 9, where the volumes of background sounds, sound effects for the own car character, sound effects for the car characters of the other game terminal devices and the volume during the display of a demonstration image can be set. In the case of selecting the game option, transition is made to a screen of FIG. 10, where a difficulty level (in several levels, e.g. set in levels 1 to 10), loop setting, the number of laps, the number of lives, an initial time, other items can be set. In the case of selecting the coin option, transition is made to a screen of FIG. 11, where a coin-credit relationship (how many coins are necessary to play one game, etc.) including a game fee and a free play and a continuation condition can be set. In FIGS. 9 to 11, L/R buttons (used to select items and modify set values) and a start button ST (confirmation) are displayed at suitable positions of the screen, e.g. on a right lower part. When these buttons are pressed down, corresponding instructions are given.

Although the network option and the ranking operation are not shown, the network option is for confirming various contents and setting and modifying them in the communication and the ranking option is for displaying a list of ranking data such as high scores and clearing them. The operator may select a desired screen according to the set items of the game environment inputted to the game terminal device.

The game environment may be individually set for each game terminal device as described above. Instead of this or in addition to this, the following method may also be adopted. Here is described a case where a game environment is set in one game terminal device.

Figure 6:
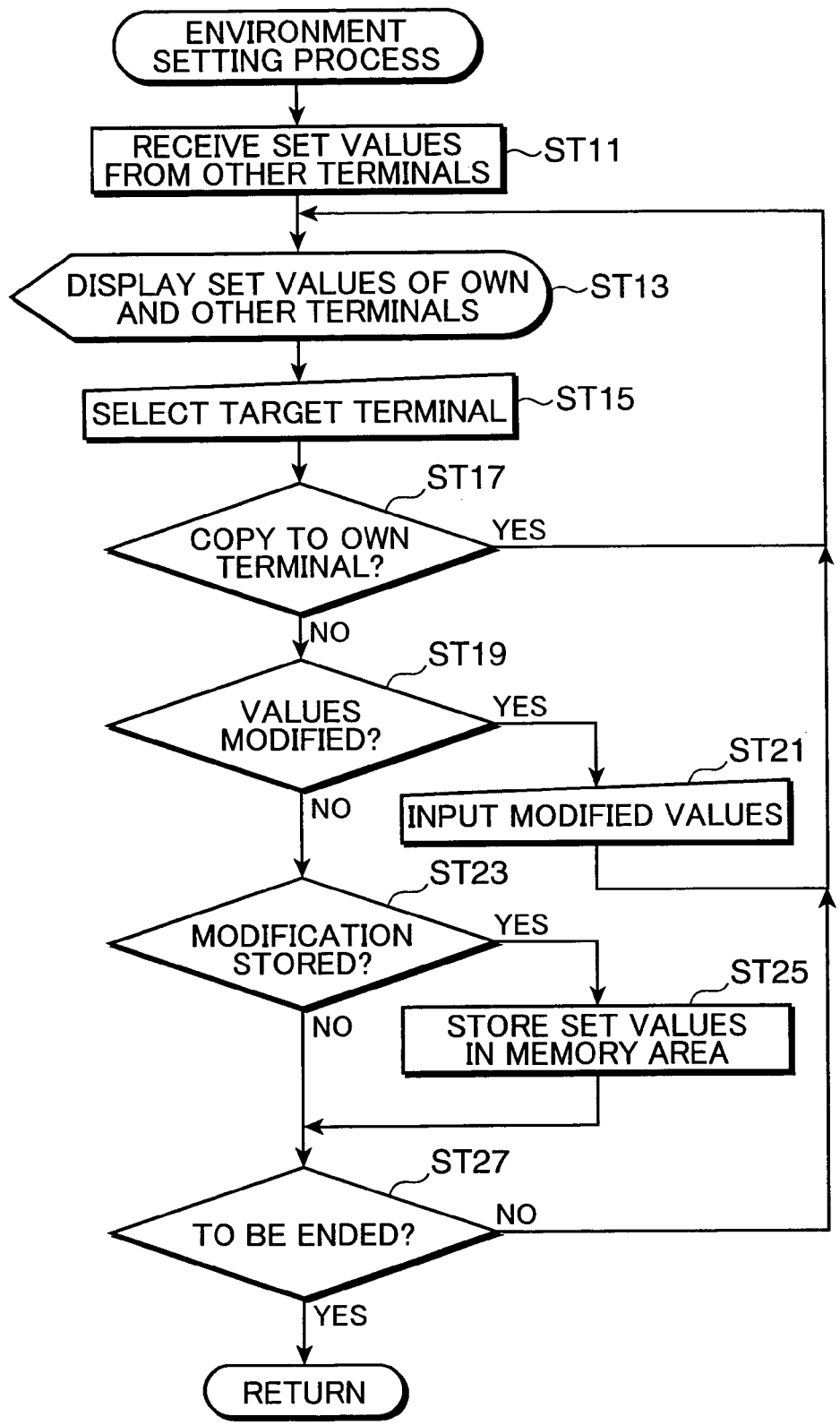
FIG. 6 is a flow chart of an environment setting process.
Figure 12:
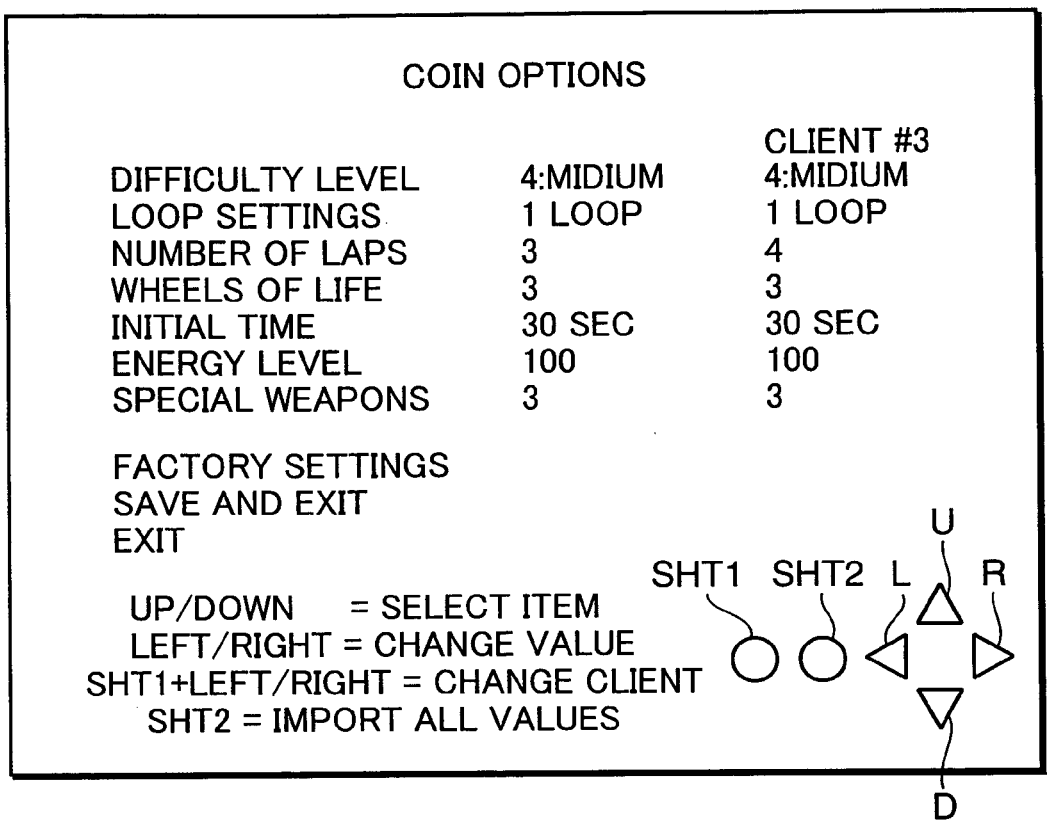
FIG. 12 is a diagram showing a display example of the screen corresponding to FIG. 6, and FIGS. 13A to 13C are diagrams showing display examples of the screen corresponding to FIG. 7.

FIG. 6 is a flow chart of the environment setting process. First of all, the game environment setting section 1613 causes a reading instruction for the browsing of the game environment set values to be transmitted from the transmitting section 1615 to all the other game terminal devices (other terminals) in the shop, here, seven game terminal devices, and the set values are received from the other terminals (Step ST11). Subsequently, the set values of the own game terminal device (own terminal) and those of the other terminals are displayed on the monitor 121 (Step ST13). FIG. 12 shows a display example of this. Here, concerning the game option, the set values of the own terminal and those of one of the other terminals (#3 in FIG. 12) are displayed side by side. The difficulty level, the loop setting, the life number, the initial time and the like have the same set values, whereas the number of laps differs since that of the own terminal is "3" and that of the other terminal (#3) is "4". The item having the different set values is displayed in different display modes, here in different colors, so that the different item and the content thereof can be seen at first glance. Buttons displayed at a right lower part of the screen include SHT1, SHT2, up and down buttons U/D and left and right buttons L/R. In order to modify the set value of the own terminal, the item can be selected by the up and down buttons U/D and the content can be modified using the left and right buttons L/R (fourth operation means) for the selected item. The respective set values can be basically modified by 1, the initial time can be modified by a specified value, e.g. by 5 (seconds) or the energy level can be modified by a value of 10 (%) in increasing and decreasing directions. By simultaneously pressing the SHT1 and the left or right button L/R down (second operation means), the other terminals are successively changed to be displayed. By this change, the set values of all the other terminals can be browsed. If the monitor 121 has a specific screen size, the set values of a specified number of other terminals may be simultaneously displayed or those of all the other terminals may be displayed at once. Further, the SHT2 button (constituting part of updating means) gives an instruction to copy (rewrite) all the set values of the selected other terminals in the game environment storage 1621.

Referring back to FIG. 6, the other terminals are successively changed to be displayed on the monitor 121 by simultaneously pressing the SHT1 and the left or right button L/R down (Step ST15), and it is then judged whether the set values of the selected other terminal are to be copied as those of the own terminal, i.e. whether or not the SHT2 button (FIG. 12) has been pressed down (Step ST17). If the SHT2 button is judged to have been pressed down, the set values of the other terminal are copied as new set values in the game environment storage 1621.

On the other hand, if no copy instruction is given, it is judged whether or not the left or right button L/R has been pressed down (Step ST19). If yes, modified values are inputted (Step ST21). Subsequently, if it is judged that a "SAVE AND EXIT" button on the screen of FIG. 12 has been pressed down without either of the left and right buttons L/R being pressed down (input to modify the set values is completed), the set values are renewably stored (Step ST25) in the game environment storage 1621, assuming that an instruction is given to store the modified values (Step ST23). If an "EXIT" button on the screen of FIG. 12 is pressed down (Step ST27), this flow is immediately exited, assuming that the process was completed. By this method, in addition to the mode of copying the set values of the game environment of the other terminal, the set values of the own terminal can be modified to desired values while referring to the other terminal having the set values closest to values after the desired modification.

Figure 7:
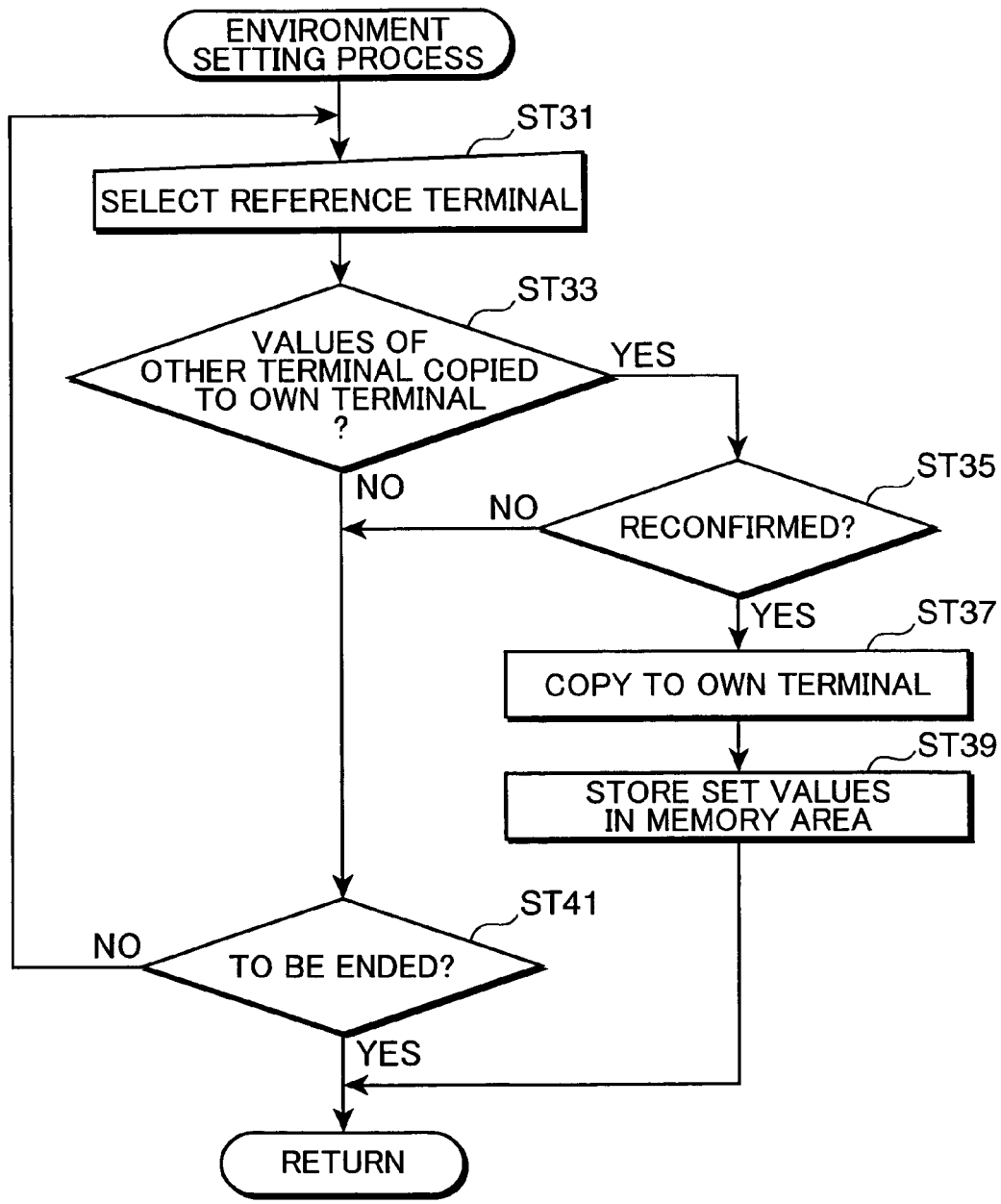
FIG. 7 is a flow chart showing another method of the environment setting process.

FIG. 7 is a flow chart showing another method of the environment setting process. In an embodiment of FIG. 7, the set values of the other terminal are imported as the set values of the own terminal at once. Upon the transition into the environment setting mode, the other terminal to be referred to is selected by simultaneously pressing the SHT1 and the left or right button L/R down as in FIG. 6 (Step ST31). It should be noted that the other terminal to be referred to may be designated beforehand.

Figure 13A:
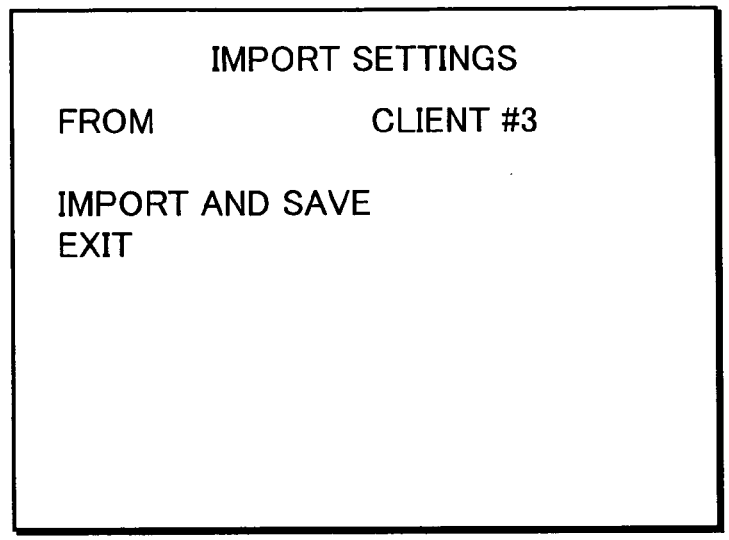
Figure 13B:
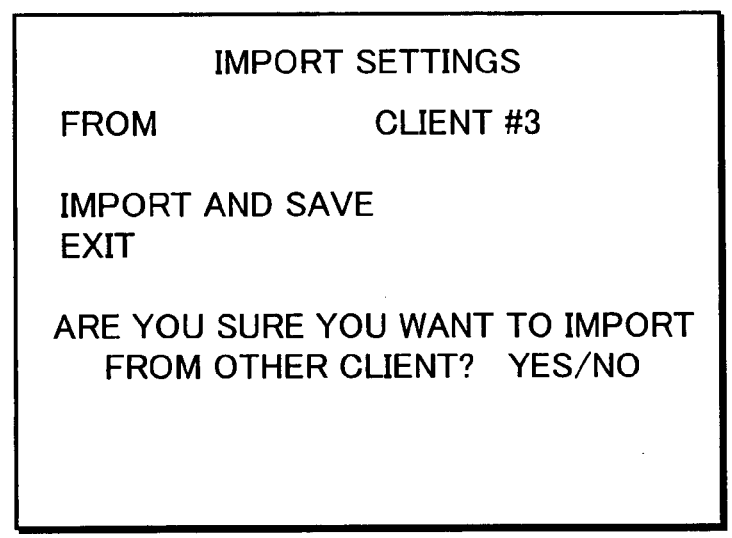
Figure 13C:
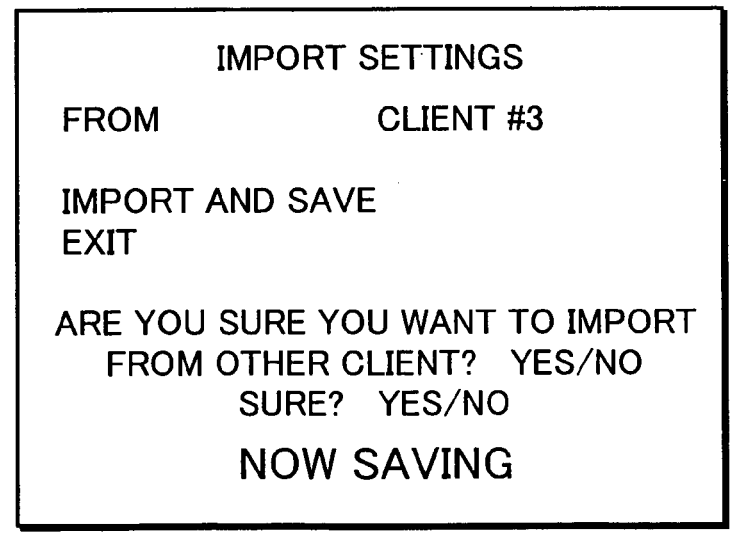

FIG. 13A shows an example of the screen after selection. On this screen, the other terminal (#3) is specified and an "IMPORT AND SAVE" button and the "EXIT" button are displayed. Whether or not the values of this other terminal are to be copied is judged based on whether or not the "IMPORT AND SAVE" button has been pressed down. If this button has been pressed down, transition is made to a reconfirmation screen shown in FIG. 13B and re-input is confirmed (Step ST35). In FIG. 13B is displayed a message "ARE YOU SURE YOU WANT TO IMPORT FROM OTHER CLIENT? YES/NO". Here, if an "YES" button (updating means) is pressed down (YES in Step ST35), an operation of copying the set values of the other terminal in the game environment storage 1621 of the own terminal is started (Step ST37) and the set values are stored in the game environment storage 1621 as a memory area (Step ST39). Subsequently, a screen of FIG. 13C indicating that importation is in process is displayed during the copying. In this way, an erroneous operation is prevented by urging reconfirmation in the mode for permitting only batch copy. If it is judged not to copy in Step ST33 or ST35, whether or not this process is to be ended is judged based on whether or not the "EXIT" button has been pressed down (Step ST41). Here, this flow is ended if the "EXIT" button has been pressed down.

Such a game environment can be relatively freely set in the case of executing a single-player game. For example, special setting can be made for hours, installation locations and events. However, in the case of executing a multiplayer game, at least the items of the game environment influential to the game result such as difficulty level and the number of laps need to be standardized if the fairness of the game is considered. This also holds for the game fee and the like. In this case, the values can be set by a simple operation.

The present invention can be modified as follows.

(1) In the above embodiment, a desired one of the other game terminal devices in the shop is selected, and the contents of the own game terminal device are partly modified while referring to the set contents of this game terminal device or the set contents are imported and rewritten in the own game terminal device. Instead, a specific one of the game terminal devices in the shop may be set beforehand using a separately provided operable member or button (third operation means) on the screen, and this specified game terminal device is automatically selected upon setting the game environment of the other game terminal devices. Particularly, in this embodiment, the specified number of game terminal devices in the shop are respectively operated by the same software. However, without being limited to this, the specified game terminal device may be set as a master device also functioning to administer the information of the other game terminal devices and the other game terminal devices may be set as such slave devices as to follow commands and requests to transmit and receive information to and from the master device. Then, if the game environment is set for the master device, the game environment may be selectively changed only for those of the other slave devices desired to be adapted to the game environment of the master device. Accordingly, individual adaptability is higher as compared with the case where the set values of the game environments of all the game terminal devices are uniformly modified to the game environment of the master device as before.

(2) Although transition is made to the environment setting mode when the operator turns the environment setting button on in the above embodiment, a game environment display control and the rewriting of the game environment may be permitted at the time of starting the device (turning the device on) or during a specified period (e.g. for confirmation of the start or for maintenance) after the start as a period for receiving this operation.

(3) Although the game terminal devices are capable of executing both the single-player game and the multiplayer game in the above embodiment, the present invention is not limited thereto and is also applicable to game terminal devices capable of executing only the single-player game or the multiplayer game.

(4) The present invention is not limited to driving games and also applicable to table games such as mahjong, shogi and playing cards, fighting games and other games executed in set game environments.

(5) Although the central server is used to administer information among the shops, the functions of the central server may be given to a shop server in each shop or may be given to the individual game terminal devices without being limited to this.

As described above, a game terminal device comprises communication means for transmitting and receiving information to or from one or more other game terminal devices; storage means for storing information; first operation means for instructing an operating state to be changed to an environment setting mode; display means for displaying set contents of a game environment; game environment display control means for, in the environment setting mode, issuing a transmission request to at least one of the other game terminal devices via the communication means, receiving set contents of game environments stored in storage means of the other game terminal devices having received the transmission request and displaying the received set contents on the display means; updating means for updating the set contents of the game environment written in the storage means to the set contents of the game environment stored in the storage means of a specified one of the other game terminal devices displayed on the display means; and transmission means for transmitting the set contents of the game environment stored in the storage means to the game terminal device requesting the transmission upon receiving the transmission request.

A game terminal device game environment setting method is for setting a game environment of a game terminal device in a game system for executing a game using game environments stored in storage means of own and other game terminal devices and comprises a step of instructing an operating state to be changed to an environment setting mode by operation means; a step of, in the environment setting mode, issuing a transmission request to at least one of the other game terminal devices via communication means, receiving set contents of game environments stored in storage means of the other game terminal devices having received the transmission request and displaying the received set contents on display means; and a step of updating the set contents of the game environment written in the storage means of the own game terminal device to the set contents of the game environment stored in the storage means of a specified one of the other game terminal devices displayed on the display means.

According to these constructions, information can be transmitted and received to and from one or more other game terminal devices via the communication means. When an instruction is given to change the operating state to the environment setting mode by the first operation means, this game terminal device enters the environment setting mode and a transmission request is issued to at least one of the other game terminal devices via the communication means. Further, by the game environment display control means, the set contents of the game environments stored in the storage means of the other game terminal devices having received this transmission request are received and browsably displayed on the display means. The set contents of the game environment written in the storage means is updated to the set contents of the game environment stored in the storage means of the specified one of the other game terminal devices displayed on the display means and written by the updating means. If the own game terminal device is in a position of the above other game terminal device, the set contents of the game environment stored in the storage means are transmitted to the game terminal device requesting the transmission by the transmitting means in response to the transmission request. Accordingly, it is possible to cope with the game environments of the individual game terminal devices, more easily perform a modification process as compared with the conventional system of the type in which a setting operation is performed in each individual game device, and enable an autonomous modification instruction from the game terminal device side.

The game terminal device preferably further comprises second operation means for specifying one game terminal device from the other game terminal devices. According to this construction, the contents of the game environment of the desired one of the other game terminal devices can be imported as the contents of the game environment of the own game terminal device.

The game terminal device preferably further comprises third operation means for specifying one game terminal device from the other game terminal devices beforehand. According to this construction, if the desired one of the other game terminal devices is specified beforehand, the contents of the game environment of the specified game terminal device can be imported as the contents of the game environment of the own game terminal device without performing any selecting operation every time.

The game environment display control means and the updating means preferably perform processes thereof during a period relating to the start of the device. According to this construction, an updating process is performed during a starting period or a period relating to the start of the device after the game terminal device is turned on. Thus, an operation of setting the game environment is performed without being forgotten when the device is turned on. Further, when the device is turned on, there are few players trying to participate in the game and there is no problem in entering the environment setting mode. In this mode, it is set beforehand by the first operation means to enter the game environment setting mode in relation to the start of the device.

The game terminal device preferably further comprises fourth operation means for individually setting a plurality of items prepared beforehand to constitute the game environment and writing them in the storage means in the environment setting mode. According to this construction, it is also possible to individually set (modify) desired item(s) while browsing the environment setting mode of the other game terminal device on the display portion in addition to the importation of the set values of the game environment of the other game terminal device as the environment set contents of the own game terminal device at once.

The game environment display control means preferably displays the set contents of the game environment stored in the storage means and those of the game environment stored in the storage means of the other game terminal device in parallel. According to this construction, it can be easily seen whether the set contents are same or different since the set contents of the game environments of the both game terminal devices are displayed for comparison.

The game environment display control means preferably simultaneously displays the set contents of the game environments stored in the storage means of the plurality of other game terminal devices on the display means. According to this construction, it can be easily seen whether the set contents are same or different since the set contents of the game environments of the respective game terminal devices are displayed for comparison.

Further, the game environment display control means preferably displays the contents in different modes for an item having different set contents in the game environments of the respective game terminal devices displayed in parallel. According to this construction, it can be easily seen whether the set contents are same or different since the item having different set contents of the game environments among the respective game terminal devices are displayed in the different modes.

It is preferable that the storage means stores default values in a non-volatile manner beforehand as the contents of the game environment; and that the fourth operation means instructs to set the contents of the game environment to a default game environment. According to this construction, the present game environment can be returned to the default game environment at once by a fourth operable member and the operation becomes easier by that much.

INDUSTRIAL APPLICABILITY

The present invention can cope with game environments of individual game terminal devices, a modification process can be more easily performed as compared with the conventional system of the type in which a setting operation is performed in each individual game terminal device, and an autonomous modification instruction can be issued from the game terminal device side.

What is claimed is:

1. A game terminal device, comprising:
communication means for transmitting and receiving information to or from one or more other game terminal devices;
storage means for storing information;
first operation means for instructing an operating state to be changed to an environment setting mode;
display means for displaying set contents of a game environment;
game environment display control means for, in the environment setting mode, issuing a transmission request to at least one of the other game terminal devices via the communication means, receiving set contents of game environments stored in storage means of the other game terminal devices having received the transmission request and displaying the received set contents on the display means;
updating means for updating the set contents of the game environment written in the storage means to the set contents of the game environment stored in the storage means of a specified one of the other game terminal devices displayed on the display means; and
transmission means for transmitting the set contents of the game environment stored in the storage means to the game terminal device requesting the transmission upon receiving the transmission request; and
wherein the game environment includes a plurality of items prepared beforehand; and
wherein the updating means updates set values of the plurality of items in the game environment stored in the storage means to set values of a plurality of items in the game environment stored in the storage means of the specified one of the other game terminal devices at once.

2. The game terminal device according to claim 1, further comprising second operation means for specifying one game terminal device from the other game terminal devices.

3. The game terminal device according to claim 1, further comprising third operation means for specifying one game terminal device from the other game terminal devices beforehand.

4. The game terminal device according to claim 1, wherein the game environment display control means and the updating means perform processes thereof during a period relating to the start of the device.

5. The game terminal device according to claim 2, wherein the game environment display control means and the updating means perform processes thereof during a period relating to the start of the device.

6. The game terminal device according to claim 3, wherein the game environment display control means and the updating means perform processes thereof during a period relating to the start of the device.

7. The game terminal device according to claim 3, further comprising fourth operation means for individually setting a plurality of items prepared beforehand to constitute the game environment and writing them in the storage means in the environment setting mode.

8. The game terminal device according to claim 2, further comprising fourth operation means for individually setting a plurality of items prepared beforehand to constitute the game environment and writing them in the storage means in the environment setting mode.

9. The game terminal device according to claim 3, further comprising fourth operation means for individually setting a plurality of items prepared beforehand to constitute the game environment and writing them in the storage means in the environment setting mode.

10. The game terminal device according to claim 1, wherein the game environment display control means displays the set contents of the game environment stored in the storage means and those of the game environment stored in the storage means of the other game terminal device in parallel.

11. The game terminal device according to claim 2, wherein the game environment display control means displays the set contents of the game environment stored in the storage means and those of the game environment stored in the storage means of the other game terminal device in parallel.

12. The game terminal device according to claim 3, wherein the game environment display control means displays the set contents of the game environment stored in the storage means and those of the game environment stored in the storage means of the other game terminal device in parallel.

13. The game terminal device according to claim 10, wherein the game environment display control means simultaneously displays the set contents of the game environments stored in the storage means of the plurality of other game terminal devices on the display means.

14. The game terminal device according to claim 10, wherein the game environment display control means displays the contents in different modes for an item having different set contents in the game environments of the respective game terminal devices displayed in parallel.

15. The game terminal device according to claim 7, wherein:
- the storage means stores default values in a non-volatile manner beforehand as the contents of the game environment; and
- the fourth operation means instructs to set the contents of the game environment to a default game environment.

16. A method for setting a game environment of a game terminal device in a game system for executing a game using game environments stored in storage means of own and other game terminal devices, comprising the steps of utilizing a processor to perform the following steps:
- instructing an operating state to be changed to an environment setting mode by operation means;
- issuing a transmission request to at least one of the other game terminal devices via communication means, receiving set contents of game environments stored in the storage means of the other game terminal devices having received the transmission request and displaying the received set contents on display means, wherein the game environment includes a plurality of items prepared beforehand; and
- updating the set contents of the game environment written in the storage means of the own game terminal device to the set contents of the game environment stored in the storage means of a specified one of the other game terminal devices displayed on the display means, wherein said updating set values of the plurality of items in the game environment stored in the storage means to set values of a plurality of items in the game environment stored in the storage means of the specified one of the other game terminal devices at once.

17. A game terminal device, comprising:
- communication means for transmitting and receiving information among the game terminal device and a plurality of other game terminal devices in a shop; local storage means for storing information including game environment set contents;
- first operation means for instructing an operating state to be changed to an environment setting mode;
- display means for displaying set contents of a game environment; game environment display control means for, in the environment setting mode, issuing a transmission request to said plurality of other game terminal devices in the shop via the communication means, receiving from said plurality of other game terminal devices set contents of game environments stored in respective storage means of the plurality of other game terminal devices having received the transmission request, and displaying on the display means the set contents of the game terminal device and the received set contents of the plurality of other game terminal devices;
- updating means for updating game environment set contents stored in the local storage means to displayed game environment set contents received from one of the plurality of other game terminal devices; and
- transmission means for transmitting the set contents of the game environment stored in the local storage means to a first other game terminal device among the plurality of other game terminal devices in response to receipt of a transmission request from said first other game terminal device.

18. A method for setting a game environment of a first game terminal device in a game system for executing a game using game environment settings stored in respective storage means of the first game terminal device and a plurality of other game terminal devices, comprising the steps of utilizing a processor to perform the following steps: instructing an operating state to be changed to an environment setting mode by operation means;
- issuing a transmission request to each of said plurality of other game terminal devices via communication means receiving set contents of game environments stored in the storage means of the plurality of other game terminal devices having received the transmission request;
- displaying on display means game environment settings stored in storage means of the first game terminal device and the received set contents of the game environments stored in the storage means of the plurality of other game terminal devices;
- updating the game environment settings stored in the storage means of the first game terminal device to displayed game environment set contents received from one of the plurality of other game terminal devices; and
- transmitting the game environment settings stored in the first game terminal storage means to another game terminal device among the plurality of other game terminal devices in response to receipt of a transmission request from said another game terminal device.

* * * * *